(12) United States Patent
Kim et al.

(10) Patent No.: US 8,980,474 B2
(45) Date of Patent: Mar. 17, 2015

(54) LITHIUM SECONDARY BATTERY

(75) Inventors: Tae-Gon Kim, Yongin-si (KR);
Hee-Joon Chun, Yongin-si (KR);
Joon-Sup Kim, Yongin-si (KR);
Wan-Uk Choi, Yongin-si (KR); Hisaki Tarui, Yongin-si (KR); Jea-Woan Lee, Yongin-si (KR); Jae-Yul Ryu, Yongin-si (KR); Young-Chang Lim, Yongin-si (KR); Seung-Hee Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 131 days.

(21) Appl. No.: 13/434,680

(22) Filed: Mar. 29, 2012

(65) Prior Publication Data
US 2013/0052508 A1 Feb. 28, 2013

(30) Foreign Application Priority Data
Aug. 31, 2011 (KR) ........................ 10-2011-0087809

(51) Int. Cl.
*H01M 4/134* (2010.01)
*H01M 4/62* (2006.01)
*H01M 4/48* (2010.01)
*H01M 10/0525* (2010.01)
*H01M 10/44* (2006.01)

(52) U.S. Cl.
CPC .............. *H01M 4/625* (2013.01); *H01M 4/483* (2013.01); *H01M 10/0525* (2013.01); *H01M 10/446* (2013.01); *Y02E 60/122* (2013.01)
USPC ........................ 429/218.1; 429/231.4; 429/126

(58) Field of Classification Search
USPC ..................................... 429/126, 218.1, 231.4
See application file for complete search history.

(56) References Cited

U.S. PATENT DOCUMENTS

| 8,026,008 | B2 | 9/2011 | Kim et al. | |
|---|---|---|---|---|
| 2002/0001748 | A1* | 1/2002 | Kamo | 429/218.1 |
| 2002/0086206 | A1* | 7/2002 | Fauteux et al. | 429/215 |
| 2004/0101762 | A1* | 5/2004 | Noh | 429/326 |
| 2005/0095504 | A1* | 5/2005 | Kim et al. | 429/246 |
| 2005/0186475 | A1 | 8/2005 | Jeong et al. | |
| 2005/0233213 | A1 | 10/2005 | Lee et al. | |

(Continued)

FOREIGN PATENT DOCUMENTS

| JP | 2005/190977 A | 7/2005 |
|---|---|---|
| JP | 2005/243640 A | 9/2005 |

(Continued)

OTHER PUBLICATIONS

European Search Report completed Nov. 6, 2012 for European Patent Application No. 12180671 (4 pages).

(Continued)

*Primary Examiner* — Stewart Fraser
*Assistant Examiner* — Olatunji Godo
(74) *Attorney, Agent, or Firm* — Christie, Parker & Hale, LLP

(57) ABSTRACT

A lithium secondary battery includes a positive electrode, a negative electrode, and an electrolyte. The negative electrode includes a current collector, an active material layer on the current collector and including an amorphous silicon oxide represented by $SiO_x$ (0.95<x<1.7), and an SEI layer on the active material layer and including about 70 area % or more of protrusion parts having a size of about 5 nm to 300 nm during charging of the battery.

13 Claims, 9 Drawing Sheets

(56) References Cited

U.S. PATENT DOCUMENTS

| | | |
|---|---|---|
| 2006/0003226 A1 | 1/2006 | Sawa et al. |
| 2007/0037063 A1* | 2/2007 | Choi et al. .................... 429/330 |
| 2007/0099086 A1* | 5/2007 | Kang et al. ............... 429/231.95 |
| 2008/0118834 A1* | 5/2008 | Yew et al. ..................... 429/217 |
| 2008/0166634 A1* | 7/2008 | Kim et al. .................. 429/218.1 |
| 2009/0068567 A1 | 3/2009 | Konishiike et al. |
| 2009/0311601 A1* | 12/2009 | Kashiwagi et al. ........ 429/218.1 |
| 2011/0129729 A1* | 6/2011 | Kim et al. .................... 429/209 |

FOREIGN PATENT DOCUMENTS

| | | |
|---|---|---|
| JP | 2007-123141 | 5/2007 |
| JP | 2008-135368 | 6/2008 |
| JP | 2010/170943 | 8/2010 |
| KR | 2005/0090218 A | 9/2005 |
| KR | 10-2010-0056581 | 5/2010 |
| WO | WO 2009/014399 * | 1/2009 |

OTHER PUBLICATIONS

Liu, et al., "Nano-porous SiO/carbon composite anode for lithium-ion batters", *J. Appl. Eletrochem.,* 2009, vol. 39, pp. 1643-1649.

Park, et al., "Characterizations and electrochemical behaviors of disproportioned SiO and its composite for rechargeable Li-ion batteries", *J. Mater. Chem.,* 2010, vol. 20, pp. 4854-4860.

Full English Machine Translation for JP 2007-123141, 22 pages.

Korean Office action for corresponding 10-2011-0087809, 5 pages.

Machine English Translation of JP 2010/170943, 42 pages.

\* cited by examiner

LITHIUM SECONDARY BATTERY

CROSS-REFERENCE TO RELATED APPLICATION

This application claims priority to and the benefit of Korean Patent Application No. 10-2011-0087809 filed in the Korean Intellectual Property Office on Aug. 31, 2011, the entire content of which is incorporated herein by reference.

BACKGROUND

1. Technical Field

Embodiments of the present invention are directed to lithium secondary batteries.

2. Description of Related Art

Batteries transform chemical energy (generated from an electrochemical redox reaction of a chemical material in the battery) into electrical energy. Such batteries are classified as primary batteries, which should be disposed of after all the energy of the battery is consumed, and rechargeable batteries, which can be recharged many times. Rechargeable batteries may be charged/discharged many times due to the reversible transformation of chemical energy to electrical energy.

Recent developments in high-tech electronics have allowed electronic devices to become small and light in weight, leading to an increase in portable electronic devices. As the power sources for such portable electronic devices, the demand for batteries having high energy density is increasing, and research is being conducted into lithium rechargeable batteries.

The lithium secondary battery is fabricated by injecting an electrolyte into an electrode assembly. The electrode assembly includes a positive electrode including a positive active material capable of intercalating/deintercalating lithium, and a negative electrode including a negative active material capable of intercalating/deintercalating lithium.

The negative active material may undergo volume expansion due to changes in the crystal structure that occur when lithium is intercalated and deintercalated. This volume expansion may cause cracks to form on the surface of the negative active material (and particularly, on the surface of the SEI layer on the negative electrode) during charge and discharge, leading to deterioration of the cycle-life characteristics of the battery.

SUMMARY

In an exemplary embodiment of the present invention, a lithium secondary battery substantially prevents volume expansion of the negative electrode, and therefore has improved cycle-life characteristics.

In another embodiment of present invention, a lithium secondary battery includes a positive electrode, a negative electrode, and an electrolyte. The negative electrode includes a current collector, a negative active material layer on the current collector, and an SEI (Solid Electrolyte Interface) layer on the negative active material layer. The negative active material layer includes negative active material particles including amorphous silicon oxide represented by $SiO_x$ (0.95<x<1.7), and a surface of the SEI layer includes about 70 area % or more of protrusion parts with a size ranging from about 5 nm to about 300 nm during charge.

The active material particles may include the amorphous silicon oxide and a carbon layer coated on at least a part of the amorphous silicon oxide.

The carbon layer may have a thickness ranging from about 1 nm to about 100 nm.

The carbon layer may have a thickness ranging from about 10 nm to about 50 nm.

The carbon layer may be included in an amount ranging from about 0.5 wt % to about 20 wt % based on the total weight of the active material particle.

The SEI layer may include about 70 area % to about 99.9 area % of protrusion parts with a size ranging from about 5 nm to 300 nm on the surface during charge.

The SEI layer may include about 80 area % to about 90 area % of protrusion parts with a size ranging from about 5 nm to 300 nm on the surface during charge.

The active material layer may include substantially no, or no crystalline Si particles.

The SEI layer may include $Li_2CO_3$, a Si—F bonding structure, or a combination thereof.

The electrolyte may include at least one solvent selected from ethylene carbonate (EC), fluorinated ethylene carbonate (FEC), ethylmethyl carbonate (EMC), and diethyl carbonate (DEC).

In one embodiment, for example, the electrolyte may include a solvent including fluorinated ethylene carbonate (FEC) and the amount of fluorinated ethylene carbonate (FEC) may be 10 volume % or more based on the total volume of the solvent.

The SEI layer may be soluble in the electrolyte.

The active material layer may have a crack occurrence ratio of about 20% or less.

The lithium secondary battery according to embodiments of the present invention substantially prevents expansion of the negative active material during charge and discharge, yielding improved cycle-life characteristics.

DETAILED DESCRIPTION OF THE EMBODIMENTS

Figure 1:
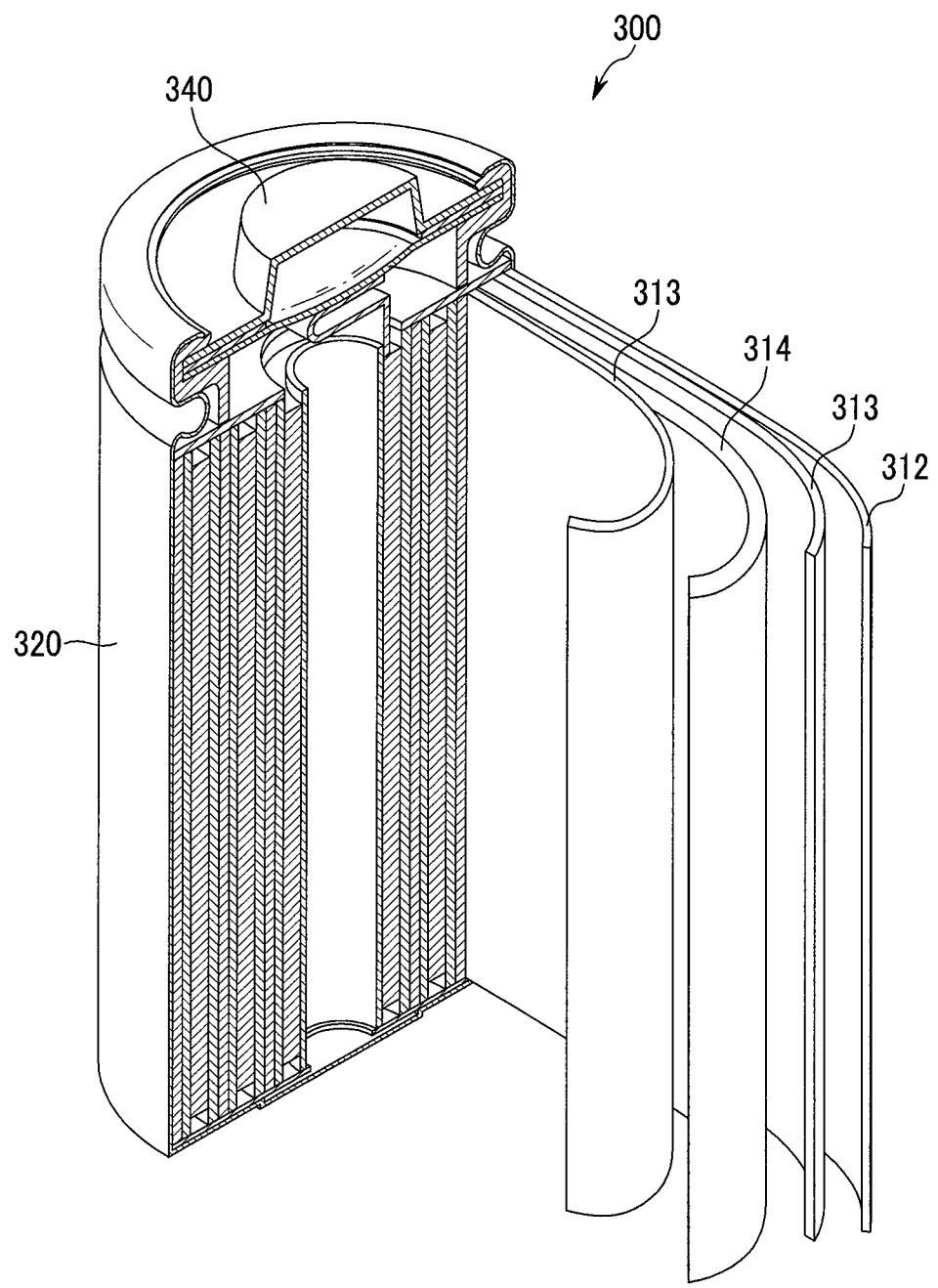
FIG. 1 is cross-sectional perspective schematic view of a lithium secondary battery according to one embodiment.

Exemplary embodiments of the present invention will now be described with reference to the drawings. However, these embodiments are only exemplary, and the present invention is not limited thereto.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
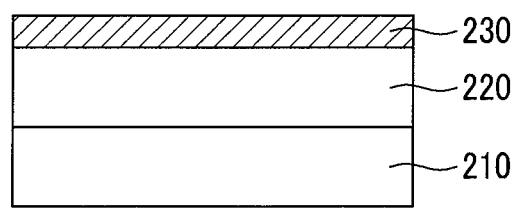
FIG. 2 is a schematic view of a negative electrode according to one embodiment of the present invention.
Figure 3:
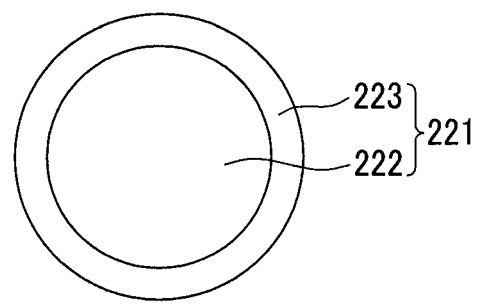
FIG. 3 is a schematic view of a negative active material according to one embodiment of the present invention.

Hereinafter, a lithium secondary battery according to one embodiment of the present invention will be described with reference to FIGS. 1 to 3. FIG. 1 is a cross-sectional perspective schematic view of a lithium secondary battery according to one embodiment. FIG. 2 is a schematic view of a negative electrode according to one embodiment. FIG. 3 is a schematic view of a negative active material according to one embodiment of the present invention.

Referring to FIG. 1, a lithium secondary battery 300 according to an exemplary embodiment of the present invention includes an electrode assembly including a negative electrode 312, a positive electrode 314, and a separator 313 between the negative and positive electrodes 312 and 314. The electrode assembly is contained in a battery case 320, an electrolyte (not shown) is impregnated therein, and a sealing member 340 seals the battery case 320.

Referring to FIG. 2, the negative electrode 312 includes a current collector 210, a negative active material layer 220 on the current collector 210, and an SEI layer (a solid electrolyte interface layer) 230 formed on the negative active material layer 220.

The current collector 210 may include a copper foil, a nickel foil, a stainless steel foil, a titanium foil, a nickel foam, or a polymer substrate coated with a conductive metal, but is not limited thereto.

The negative active material layer 220 includes a negative active material, a binder, and optionally a conductive material.

The negative active material may include a material being capable of alloying/dealloying with lithium and may be in the form of particles.

Referring to FIG. 3, the negative active material particle 221 includes an amorphous silicon oxide 222 particle at least partly coated with a carbon layer 223.

The amorphous silicon oxide 222 may be represented by the chemical formula $SiO_x$ ($0.95<x<1.7$).

The amorphous silicon oxide 222 exists in an amorphous state in which the silicon (Si) and oxygen (O) atoms are disordered. The oxygen plays the role of a buffer and maintains the structural stability of the negative active material. Accordingly, suppression of volume expansion of the negative active material during charge and discharge may be substantially suppressed.

In the above formula (i.e., $SiO_x$), x indicates the ratio of oxygen atoms (O) to silicon atoms (Si), and may be in a range of about $0.95<x<1.7$. The x may be measured using X-ray fluorescence (XRF). When the amorphous silicon oxide 222 includes an amount of oxygen within this range, the oxygen atoms may work as a buffer during charge and discharge of the lithium secondary battery, and thus substantially prevent cracks due to sharp expansion of the amorphous silicon oxide and simultaneously secure a sufficient amount of silicon in the silicon oxide, thereby improving the charge and discharge capacity and efficiency of the lithium secondary battery.

In some embodiments, x may be in a range of $1.00<x<1.25$.

The carbon layer 223 may have a thickness ranging from about 1 nm to about 100 nm, for example, from about 10 nm to 50 nm.

The carbon layer 223 may be thin and have a smooth surface. The thin and smooth carbon layer 223 may be formed of an aromatic cyclic compound (for example, toluene and the like) as a carbon source gas.

The carbon layer 223 may be relatively less graphitized.

The graphitization degree may be evaluated using Raman spectroscopy. When the G peak is defined to have a central value of about $1580\pm50$ cm$^{-1}$, and the D peak is defined to have a central value of about $1350\pm50$ cm$^{-1}$, the carbon layer 223 may have a G peak with a full width at half maximum (FWHM) ranging from about 50 cm$^{-1}$ to about 110 cm$^{-1}$ and a D peak with a full width at half maximum (FWHM) ranging from about 70 cm$^{-1}$ to about 220 cm$^{-1}$.

When the carbon layer 223 has a full width at half maximum (FWHM) within the above range, it may improve the conductivity of the carbon material but substantially prevent crystallization of the amorphous silicon oxide.

The carbon layer 223 may be included in an amount of about 0.5 wt % to about 20 wt % based on the total weight of the negative active material particle 221.

The negative active material particles 221 may have a particle size distribution with a D90 value of about 50 μm or less (i.e., 90% of the particles have a size within this range) as measured by laser diffraction particle size distribution analysis. For example, the D90 value may be about 0.5 μm to about 40 μm. When the negative active material particle 221 has D90 value within these ranges, the negative active material particles 221 may maintain an appropriate specific surface area, and thus sustain substantially no damage (such as scratches and the like) on the surface of the current collector during coating of a negative active material slurry having little binder.

The negative active material particle 221 includes an amorphous silicon oxide 222 at least partly coated with a carbon layer 223, as a first negative active material particle, and may further include a carbon-based material particle as a second negative active material particle. A mixing ratio of the first negative active material particle and the second negative active material particle may be 1:99 to 99:1 wt %.

The negative active material may be included in an amount ranging from about 60 wt % to about 99 wt % based on the total weight of the negative active material layer 220. For example, the negative active material may be included in an amount of about 80 wt % to about 98 wt %. When the negative active material is included in an amount within these ranges, capacity may be improved.

The binder improves the binding properties of the negative active material particles to one another and also to the current collector. Nonlimiting examples of the binder include polyvinylalcohol, carboxymethylcellulose, hydroxypropylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The binder may be included in an amount ranging from about 1 wt % to about 20 wt % based on the total weight of the negative active material layer. For example, the binder may be included in an amount of about 2 wt % to about 10 wt % based on the total weight of the negative active material layer. When the binder is included in an amount within these ranges, sufficient adhesion can be obtained without deteriorating capacity.

The conductive material may be included to improve the conductivity of the electrode. The conductive material may include any electrically conductive material so long as it does not cause a chemical change. Nonlimiting examples of the conductive material include carbon-based materials such as natural graphite, artificial graphite, carbon black, acetylene black, ketjen black, carbon fiber, and the like; metal-based materials such as metal powders, metal fibers, or the like that include copper, nickel, aluminum, silver, and the like; conductive polymers such as polyphenylene derivatives; and mixtures thereof.

The conductive material may be included in an amount ranging from 0 to about 20 wt % based on the total weight of the negative active material layer. For example, the conductive material may be included in an amount of about 1 wt % to about 10 wt % based on the total weight of the negative active material layer. When the conductive material is included in an amount within these ranges, conductivity may be improved without deteriorating capacity.

The negative electrode may be fabricated by mixing the negative active material, the binder, and the conductive material in a solvent to prepare an active material slurry, and coating the slurry on a current collector. The solvent may include N-methylpyrrolidone or the like, but is not limited thereto.

The negative active material layer 220 includes an amorphous silicon oxide including a specified amount of oxygen and a thin, uniform carbon layer coated thereon. This composition of the negative active material layer substantially prevents the occurrence of volume expansion during charge and discharge of the lithium secondary battery, yielding fewer cracks and improving the efficiency and cycle-life characteristic of the lithium secondary battery.

The negative active material layer 220 may have, for example, a crack occurrence ratio of about 20% or less. Herein, the crack occurrence ratio is the ratio of the number of particles with a crack to the total number of particles on the surface of the SEI, as determined by examination using a scanning electron microscope (SEM) at a magnification of 2500.

The SEI layer 230 is formed by reaction of the electrolyte on the surface of the negative active material layer 220 during initial charge. In other words, the SEI layer 230 is formed from the reaction of the negative active material (including amorphous silicon oxide coated with a carbon layer) with an electrolyte.

The SEI layer 230 formed on the surface of the negative active material layer 220 may prevent the negative active material layer 220 from contacting the electrolyte during charge and discharge, and reversibly maintains the amount of lithium ions in the electrolyte without decomposing the electrolyte, thereby maintaining a stable battery cycle life.

The SEI layer 230 may maintain a uniform and smooth surface despite repeated charge and discharge cycles. In other words, the SEI layer 230 may have a relatively small crack occurrence ratio of about 20% or less, and a skin-type surface in which protrusion parts with a size within the range described above after repeated charge and discharge cycles, even after charge and discharge at high rates such as 1 C, for several tens of cycles, are uniformly distributed.

For example, even though the charge and discharge processes are performed for 1 to 50 cycles in which the battery is constant current and constant voltage (CC/CV) charged at 0.5 C to a cut-off voltage of 4.35V, and is constant current discharged at 0.5 C to a cut-off voltage of 2.75V, the SEI layer according to the embodiment of the invention may have a crack occurrence ratio of about 20% or less and protrusion parts with a predetermined size.

For example, the SEI layer 230 may include about 70 area % or more of protrusion parts having a size ranging from about 5 nm to about 300 nm, based on the total area of the SEI layer, on its surface. Specifically, about 70 area % to about 99.9 area % of the particles on the surface of the SEI layer 230 has protrusion parts sizes within this range. For example, about 80 area % to about 90 area % of the protrusion parts on the surface of the SEI layer has sizes within these ranges. The SEI layer is in contrast to a conventional SEI layer which has a turtle-type surface having a large amount of cracks, and including protrusion parts with various sizes, yielding a rough surface.

The SEI layer 230 may include $Li_2CO_3$, a Si—F bonding structure, or a combination thereof. The $Li_2CO_3$ may be formed from lithium ions and carbon in a carbon layer, and the Si—F bonding structure may be formed from silicon in an amorphous silicon oxide and a fluorine-containing electrolyte such as fluoroethylene carbonate (FEC). Herein, the components of the SEI layer 230 may be analyzed using FT-IR, and the SEI layer components may be identified by the appearance of a peak in their respective wavelength regions. For example, the $Li_2CO_3$ may be identified by the appearance of a peak of about 1430 $cm^{-1}$, and the Si—F bonding structure may be identified by the appearance of a peak at about 870 $cm^{-1}$.

The SEI layer 230 may be soluble in the electrolyte.

The positive electrode 314 may include a current collector and a positive active material layer on the current collector.

The current collector may be aluminum (Al) but is not limited thereto.

The positive active material layer includes a positive active material, a binder, and a conductive material.

For the positive active material, compounds capable of reversibly intercalating and deintercalating lithium ions may be used without limitation. Nonlimiting examples of the positive active material include composite oxides including lithium (Li) and a metal selected from the group consisting of cobalt (Co), manganese (Mn), nickel (Ni), and combinations thereof.

Nonlimiting examples of positive active materials include compounds satisfying the following formulae:

$Li_aA_{1-b}D_bE_2$ (0.90≤a≤1.8, and 0≤b≤0.5)

$Li_aG_{1-b}D_bO_{2-c}J_c$ (0.90≤a≤1.8, 0≤b≤0.5, and 0≤c≤0.05)

$LiG_{2-b}D_bO_{4-c}J_c$ (0≤b≤0.5, and 0≤c≤0.05)

$Li_aNi_{1-b-c}Co_bD_cE_\alpha$ (0.90≤a≤1.8, 0≤b≤0.5, 0≤c≤0.05, and 0<α≤2)

$Li_aNi_{1-b-c}Co_bD_cO_{2-\alpha}J_\alpha$ (0.90≤a≤1.8, 0≤b≤0.5, 0≤c≤0.05, and 0<α<2)

$Li_aNi_{1-b-c}Co_bD_cO_{2-\alpha}J_2$ (0.90≤a≤1.8, 0≤b≤0.5, 0≤c≤0.05, and 0<α<2)

$Li_aNi_{1-b-c}Mn_bD_cE_\alpha$ (0.90≤a≤1.8, and 0≤b≤0.5, 0≤c≤0.05, 0<α≤2)

$Li_aNi_{1-b-c}Mn_bD_cO_{2-\alpha}J_\alpha$ (0.90≤a≤1.8, 0≤b≤0.5, 0≤c≤0.05, and 0<α<2)

$Li_aNi_{1-b-c}Mn_bD_cO_{2-\alpha}J_2$ (0.90≤a≤1.8, 0≤b≤0.5, 0≤c≤0.05, and 0<α<2)

$Li_aNi_bG_cL_dO_2$ (0.90≤a≤1.8, 0≤b≤0.9, 0≤c≤0.5, and 0.001≤d≤0.1)

$Li_aNi_bCo_cMn_dL_eO_2$ (0.90≤a≤1.8, 0≤b≤0.9, 0≤c≤0.5, 0≤d≤0.5, and 0.001≤e≤0.1)

$Li_aNiL_bO_2$ (0.90≤a≤1.8, and 0.001≤b≤0.1)

$Li_aCoL_bO_2$ (0.90≤a≤1.8, and 0.001≤b≤0.1)

$Li_aMnL_bO_2$ (0.90≤a≤1.8, and 0.001≤b≤0.1)

$Li_aMn_2L_bO_4$ (0.90≤a≤1.8, and 0.001≤b≤0.1)

$QO_2$ $QS_2$ $LiQS_2$ $V_2O_5$ $LiV_2O_5$ $LiRO_2$ $LiNiVO_4$ $Li_{(3-f)}Z_2(PO_4)_3$ (0≤f≤2)

$Li_{(3-f)}Fe_2(PO_4)_3$ (0≤f≤2)

$LiFePO_4$

In the above formulae, A may be selected from Ni, Co, Mn, and combinations thereof. D may be selected from Al, Ni, Co, Mn, Cr, Fe, Mg, Sr, V, rare earth elements, and combinations thereof. E may be selected from O, F, S, P, and combinations thereof. G may be selected from Co, Mn, and combinations thereof. J may be selected from F, S, P, and combinations thereof. L may be selected from Al, Cr, Mn, Fe, Mg, La, Ce, Sr, V, and combinations thereof. Q may be selected from Ti, Mo, Mn, and combinations thereof. R may be selected from Cr, V, Fe, Sc, Y, and combinations thereof. Z may be selected from V, Cr, Mn, Co, Ni, Cu, and combinations thereof.

The binder and conductive material are the same as described above.

The separator 113 separates the negative electrode 112 from the positive electrode 114 and provides a path for lithium ions and may include anything conventionally used in lithium batteries. In other words, the separator 113 may include anything having low resistance against the transportation of electrolyte ions and good electrolyte wetting capability. For example, the separator 113 may be selected from glass fiber, polyester, TEFLON (polytetrafluoroethylene), polyethylene, polypropylene, polytetrafluoroethylene (PTFE), or a combination thereof, which is either non-woven fabric or fabric. For example, a lithium ion battery may include a polyolefin-based polymer separator such as polyethylene, polypropylene, or the like, but in order to ensure heat resistance or mechanical strength, the separator can be one coated with a ceramic component or a polymer material. The separator may optionally be a single layer separator or a multi-layer separator.

The electrolyte may include a non-aqueous organic solvent and a lithium salt.

The non-aqueous organic solvent serves as a medium for transmitting the ions taking part in the electrochemical reaction of the battery. The non-aqueous organic solvent may include a carbonate-based, ester-based, ether-based, ketone-based, alcohol-based, or aprotic solvent. Nonlimiting examples of the carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), vinylene carbonate (VC), fluorinated ethylene carbonate (FEC), and the like. Nonlimiting examples of the ester-based solvent may include methyl acetate (MC), ethyl acetate (EC), n-propyl acetate (PC), dimethylacetate, methylpropionate, ethylpropionate, ɤ-butyrolactone, decanolide, valerolactone, DL-mevalonolactone, caprolactone, and the like. Nonlimiting examples of the ether-based solvent include dibutyl ether, tetraglyme, diglyme, dimethoxyethane, 2-methyltetrahydrofuran, tetrahydrofuran, and the like. Nonlimiting examples of the ketone-based solvent include cyclohexanone and the like. Nonlimiting examples of the alcohol-based solvent include ethanol, isopropyl alcohol, and the like. Nonlimiting examples of the aprotic solvent include nitriles such as X—CN (where X is a C2 to C20 linear, branched, or cyclic hydrocarbon group, and may include a double bond, an aromatic ring, or an ether bond), and the like; amides such as dimethylformamide, dioxolanes such as 1,3-dioxolane, sulfolanes, and the like.

A single non-aqueous organic solvent may be used, or a mixture of solvents may be used. When a mixture of organic solvents is used, the mixture ratio can be adjusted in accordance with the desired battery performance.

In one embodiment, the non-aqueous organic solvent may include an organic solvent including at least one selected from ethylene carbonate (EC), fluorinated ethylene carbonate (FEC), ethylmethyl carbonate (EMC) and diethylcarbonate (DEC). In another embodiment, the solvent may include fluorinated ethylene carbonate (FEC) at an amount of 10 volume % or more based on the total volume of the solvent. In another embodiment, the solvent may include fluorinated ethylene carbonate (FEC) at an amount of 10 volume % to 20 volume % based on the total volume of the solvent, in still another embodiment, the solvent may include fluorinated ethylene carbonate (FEC) at an amount of about 10 volume % based on the total volume of the solvent.

The lithium salt is dissolved in the non-aqueous organic solvent and supplies the lithium ions in the battery, enabling the basic operation of the lithium secondary battery and improving lithium ion transportation between the positive and negative electrodes.

The lithium salt may include one selected from $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_6SO_2)_2$, $LiAlO_2$, $LiAlCl_4$, $LiN(C_pF_{2p+1}SO_2)(C_qF_{2q+1}SO_2)$ wherein p and q are natural numbers, LiCl, LiI, lithium bisoxalato borate, and mixtures thereof.

The lithium salt may be used in a concentration ranging from about 0.1 M to 2.0M, for example about 0.7M to 1.6M. When the lithium salt is used in a concentration within these ranges, a suitable viscosity of the electrolyte may be obtained, thereby maintaining suitable electrolyte performance and mobility of lithium ions.

The following examples are presented for illustrative purposes only, and are not in any sense to be interpreted as limiting the scope of this disclosure.

Preparation of Negative Active Material

Preparation Example 1

A Si target and a $SiO_2$ target were positioned in an opposite direction to a stainless steel (SUS) substrate, and an argon DC pulse sputtering procedure was performed by applying DC pulse power of 6.6 kW and 10.0 kW, respectively, to the targets.

According to the procedures, an amorphous silicon oxide having the chemical formula $SiO_x$ (x: 1.05) was formed on a surface of the SUS substrate and collected from the substrate. The amorphous silicon oxide was pulverized and sieved under an inert $N_2$ atmosphere to prepare amorphous silicon oxide particles of $SiO_x$ (x: 1.05) with an average diameter of 5 μm.

Next, chemical vapor deposition (CVD) was performed by supplying toluene to the amorphous silicon oxide particles at 900° C. to form a 20 nm-thick carbon layer thereon, thereby preparing a negative active material. Herein, the carbon layer was 1 wt % based on the total weight of the amorphous silicon oxide and the carbon layer.

Preparation Example 2

A negative active material was prepared as in Preparation Example 1, except that the DC pulse powers were changed to 3.3 kW and 10.0 kW to prepare an amorphous silicon oxide with the chemical formula $SiO_x$ (x: 1.13).

Preparation Example 3

A negative active material was prepared as in Preparation Example 1, except that the DC pulse powers were changed to 2.0 kW and 10.0 kW to prepare an amorphous silicon oxide with the chemical formula $SiO_x$ (x: 1.42).

Preparation Example 4

A negative active material was prepared as in Preparation Example 1, except that the DC pulse powers were changed to 1.4 kW and 10.0 kW to prepare an amorphous silicon oxide with the chemical formula $SiO_x$ (x: 1.58).

Comparative Preparation Example 1

A Si target and a $SiO_2$ target were positioned in the opposite direction to a stainless steel (SUS) substrate and an argon DC pulse sputtering procedure was performed by applying DC pulse power of 6.6 k W and 10.0 kW, respectively to the targets under a reduced pressure atmosphere.

According to the procedures, an amorphous silicon oxide having the chemical formula $SiO_x$ (x: 1.05) was formed on a surface of the SUS substrate and collected from the substrate. The amorphous silicon oxide was pulverized and sieved under an inert $N_2$ atmosphere to prepare amorphous silicon oxide particles of $SiO_x$ (x: 1.05) with an average diameter of 5 μm.

The amorphous silicon oxide particles were disproportionated at 1200° C. under an argon (Ar) atmosphere to prepare a silicon oxide at which a plurality of Si crystal particles with a size ranging from 10 to 20 nm were grown. Next, chemical vapor deposition (CVD) was performed by supplying toluene to the amorphous silicon oxide particles at 900° C. to coat a 20 nm-thick thin film-type carbon layer thereon. The resulting material was heat-treated at 1100° C. under an $N_2$ atmosphere, thus preparing a negative active material including silicon oxide with a carbon coating layer having a relatively high graphitization degree.

Comparative Preparation Example 2

A Si target and a $SiO_2$ target were positioned in the opposite direction to a stainless steel (SUS) substrate, and an argon DC pulse sputtering procedure was performed by applying a DC pulse power of 6.6 kW and 10.0 kW, respectively to the targets under a reduced pressure atmosphere.

According to the procedures, an amorphous silicon oxide having the chemical formula $SiO_x$ (x: 1.05) was formed on a surface of the SUS substrate and collected from the substrate. The amorphous silicon oxide was pulverized and sieved under an inert $N_2$ atmosphere to prepare amorphous silicon oxide particles of $SiO_x$ (x: 1.05) with an average diameter of 5 on. The amorphous silicon oxide particles were disproportionated at 1200° C. under an argon (Ar) atmosphere to prepare a silicon oxide at which a plurality of Si crystal particles with a size ranging from 10 to 20 nm, were grown. Next, chemical vapor deposition (CVD) was performed by supplying methane ($CH_4$) gas to the amorphous silicon oxide particles at 1050° C. to coat a 100 nm-thick flake-type carbon layer thereon. The resulting material was heat-treated at 1100° C. under an $N_2$ atmosphere, thereby preparing a negative active material including a silicon oxide with a carbon coating layer having a relatively high graphitization degree.

Evaluation—1

The negative active materials according to Preparation Example 1 and Comparative Preparation Example 1 were examined using X-ray diffraction (XRD) to determine crystallinity.

Figure 4A:
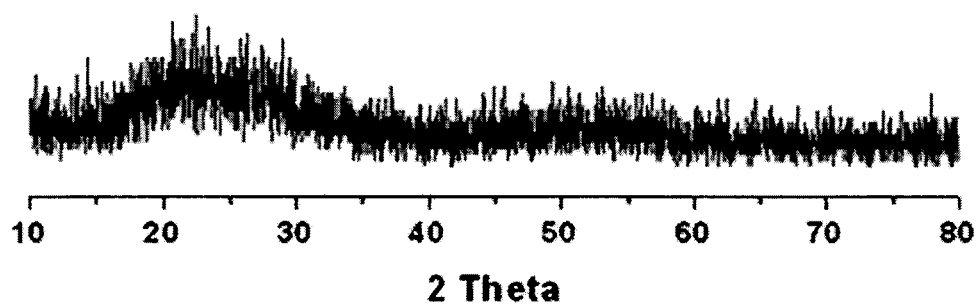
FIG. 4A is an X-ray diffraction graph of the negative active material prepared according to Preparation Example 1.
Figure 4B:
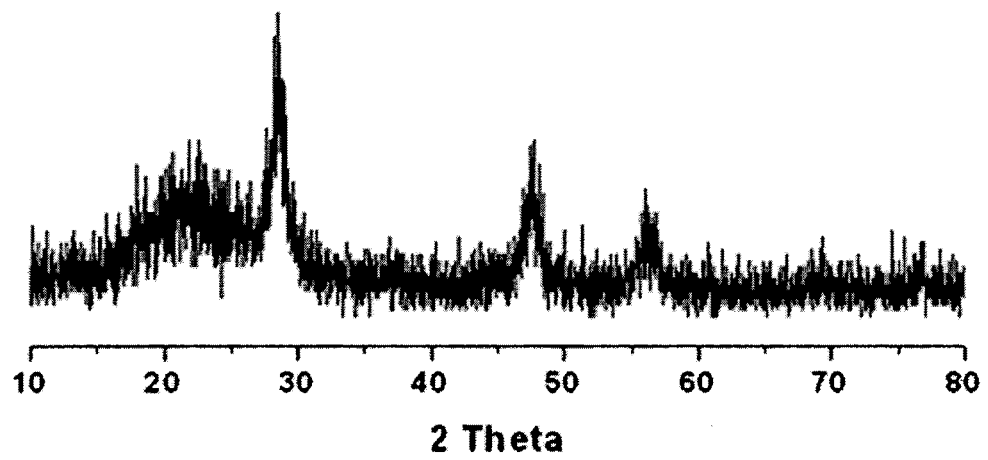
FIG. 4B is an X-ray diffraction graph of the negative active material prepare according to Comparative Preparation Example 1.

FIGS. 4A and 4B, respectively, depict the X-ray diffraction (XRD) graphs of the negative active materials according to Preparation Example 1 (FIG. 4) and Comparative Preparation Example 1 (FIG. 5).

Referring to FIGS. 4A and 4B, the negative active material according to Preparation Example 1 was found to have no Si crystal particle peak, while the negative active material according to Comparative Preparation Example 1 was found to have a Si crystal particle peak.

Evaluation—2

Raman spectrums of the carbon coating layer of the negative active materials according to Preparation Example 1 and Comparative Preparation Example 1 were measured. The results are shown in FIGS. 5A and 5B, respectively.

Figure 5A:
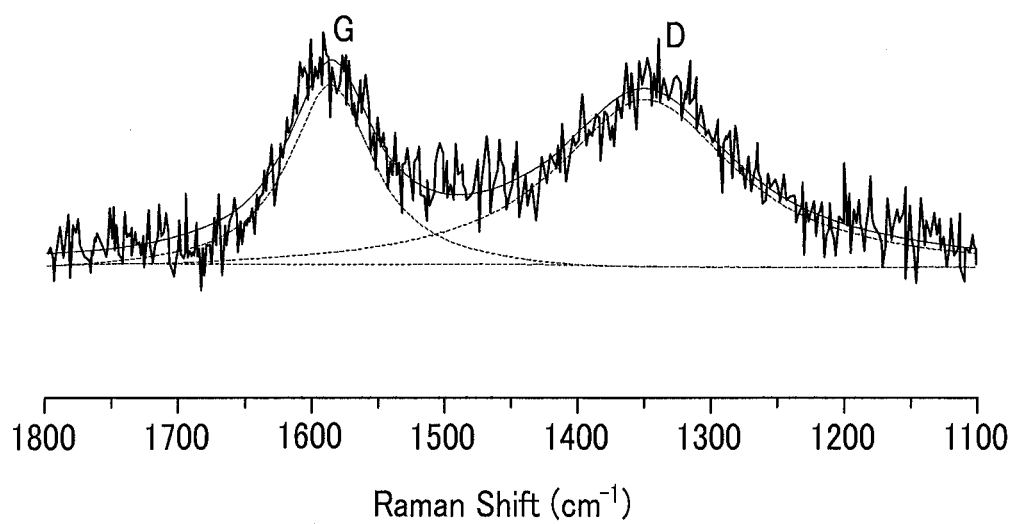
FIG. 5A is a Raman spectrum graph of the negative active material according to Preparation Example 1.
Figure 5B:
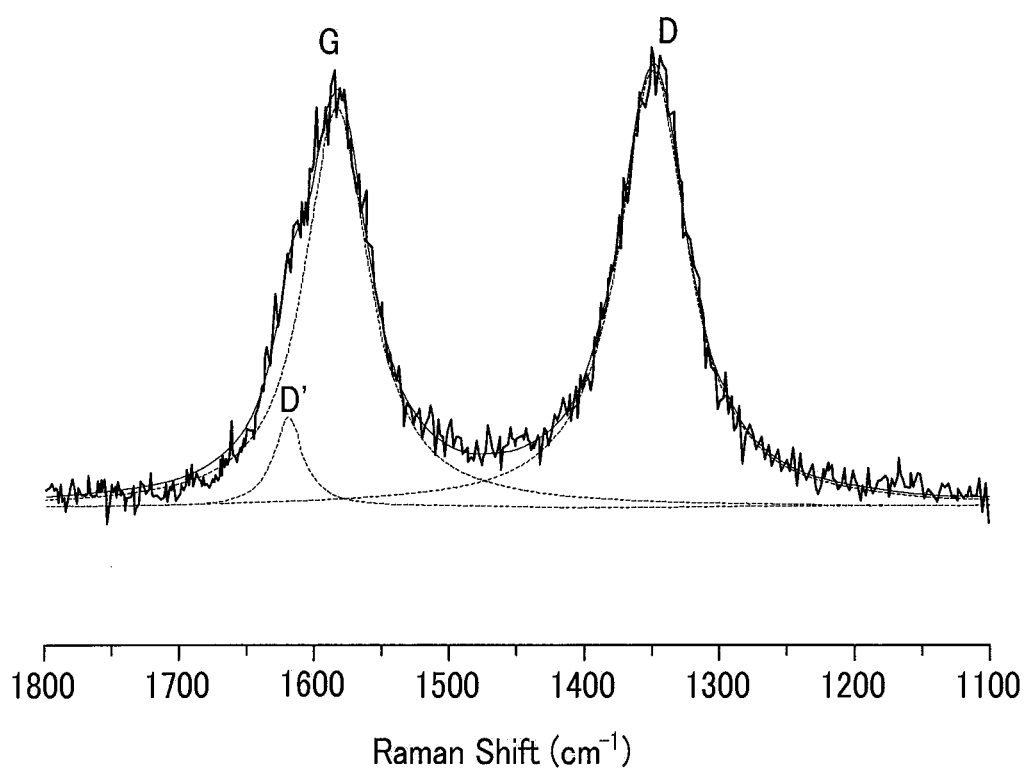
FIG. 5B is a Raman spectrum graph of the negative active material according to Comparative Preparation Example 1.

As shown in FIG. 5A, the carbon coating layer of the negative active material according to Preparation Example 1 had a G peak with a full width at half maximum (FWHM) ranging from about 70 $cm^{-1}$ and a D peak with a full width at half maximum (FWHM) ranging from about 40 $cm^{-1}$, when the G peak is defined to have a central value of about 1580±50 $cm^{-1}$, and the D peak is defined to have a central value of about 1350±50 $cm^{-1}$. Whereas, the carbon coating layer of the negative active material according to Comparative Preparation Example 1 had a G peak with a full width at half maximum (FWHM) ranging from about 55 $cm^{-1}$ and a D peak with a full width at half maximum (FWHM) ranging from about 60 $cm^{-1}$.

Fabrication of Battery Cell

Example 1

90 wt % of the negative active material according to Preparation Example 1 was mixed with 10 wt % of polyimide as a binder in an N-methylpyrrolidone solvent, thereby preparing negative active material slurry. The negative active material slurry was coated on a copper foil current collector, thereby fabricating a negative electrode.

On the other hand, a positive active material slurry was prepared by mixing 96 wt % of a LMO(LiMn$_2$O$_4$)/NCM (LiNi$_{0.3}$Co$_{0.3}$Mn$_{0.3}$O$_2$) positive active material, 2 wt % of PVdF (polyvinylidene fluoride), and 2 wt % of a conductive material in an N-methylpyrrolidone solvent. The positive active material slurry was coated on an aluminum foil current collector, thereby fabricating a positive electrode.

The negative and positive electrodes, a polyethylene film as a separator, and an electrolyte were used to fabricate a battery cell. The electrolyte solution was prepared by mixing 1.3M LiPF$_6$ in an ethylcarbonate (EC)/fluorinated ethylenecarbonate (FEC)/ethylmethylcarbonate (EMC)/diethylcarbonate (DEC) (1/2/2/5, v/v) solvent.

Example 2

A battery cell was fabricated as in Example 1, except that the negative active material according to Preparation Example 2 was used instead of the negative active material according to Preparation Example 1.

Example 3

A battery cell was fabricated as in Example 1, except that the negative active material according to Preparation Example 3 was used instead of the negative active material according to Preparation Example 1.

Example 4

A battery cell was fabricated as in Example 1, except that the negative active material according to Preparation Example 4 was used instead of the negative active material according to Preparation Example 1.

Comparative Example 1

A battery cell was fabricated as in Example 1, except that the negative active material according to Comparative Preparation Example 1 was used instead of the negative active material according to Preparation Example 1.

Comparative Example 2

A battery cell was fabricated as in Example 1, except that the negative active material according to Comparative Preparation Example 2 was used instead of the negative active material according to Preparation Example 1.

Evaluation—3

After formation of the lithium secondary battery cells according to Examples 1 to 4 and Comparative Examples 1 and 2 was completed, the cells were charged and discharged 1 time and 50 times, and then the surface of the SEI layer in each cell was examined.

The lithium secondary battery cells were charged and discharged under the following conditions.

Charge and Discharge Conditions

Formation Charge and Discharge (once charge/discharge)
Charge: constant current/constant voltage (CC/CV), 0.2 C, 4.35 V, cut-off (0.05 C)
Discharge: CC, 0.2 C, 2.75 V
Cycle life charge and discharge for 1st to 50th cycles
Charge: CC/CV, 0.5 C, 4.35 V, cut-off (0.05 C)
Discharge: CC, 0.5 C, 2.75 V The surfaces of the SEI layers were examined at a magnification of 2500 and 50000, respectively, using a scanning electron microscope (SEM) by decomposing the negative electrodes and cleaning them with dimethyl carbonate (DMC) after completion of the formation charge and discharge of the battery cells under the above conditions.

The battery cells according to Examples 1 through 4 were charged, and then the particle size distributions of particles on the surface of the SEI layer were evaluated (the magnification of 50,000, charge state).

The results are provided in Table 1 below. In the Table 1, the protrusion parts size distribution (%) refers to the area ratio (%) of the area of the region including the protrusion parts with each size to the total area.

TABLE 1

| | Protrusion parts size distribution of SEI layer surface (%) | | | | |
|---|---|---|---|---|---|
| | 5-100 nm | 101-200 nm | 201-300 nm | 301-400 nm | 401-500 nm |
| Example 1 | 57 | 12 | 12 | 10 | 9 |
| Example 2 | 53 | 19 | 9 | 11 | 8 |
| Example 3 | 59 | 13 | 10 | 8 | 10 |
| Example 4 | 57 | 14 | 13 | 9 | 7 |
| Comparative Example 1 | 1 | 8 | 13 | 47 | 31 |
| Comparative Example 2 | 3 | 10 | 9 | 42 | 36 |

As shown in Table 1, the battery cells according to Examples 1 through 4 included smaller protrusion parts on the surface of the SEI layer than the battery cells according to Comparative Examples 1 and 2. More than or equal to about 80 area % of the protrusion parts on the surface of the SEI layer in the battery cells according to Examples 1 through 4 were distributed in a range of about 5 nm to 300 nm.

Figure 6A:
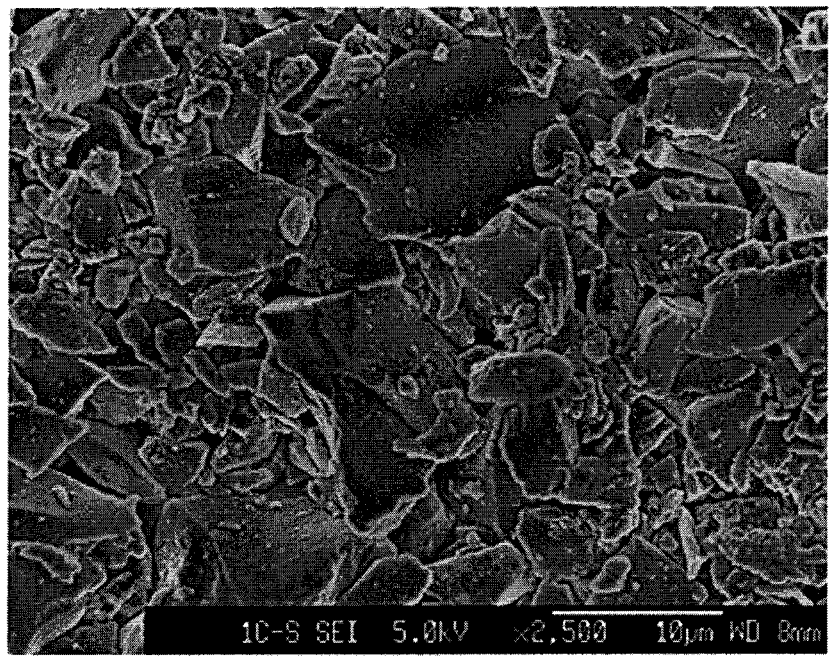
FIGS. 6A and 6B are scanning electron microscope (SEM) photographs taken of the surface of the SEI layer in the battery cell prepared according to Example 1 after one charge and discharge cycle.
Figure 6B:
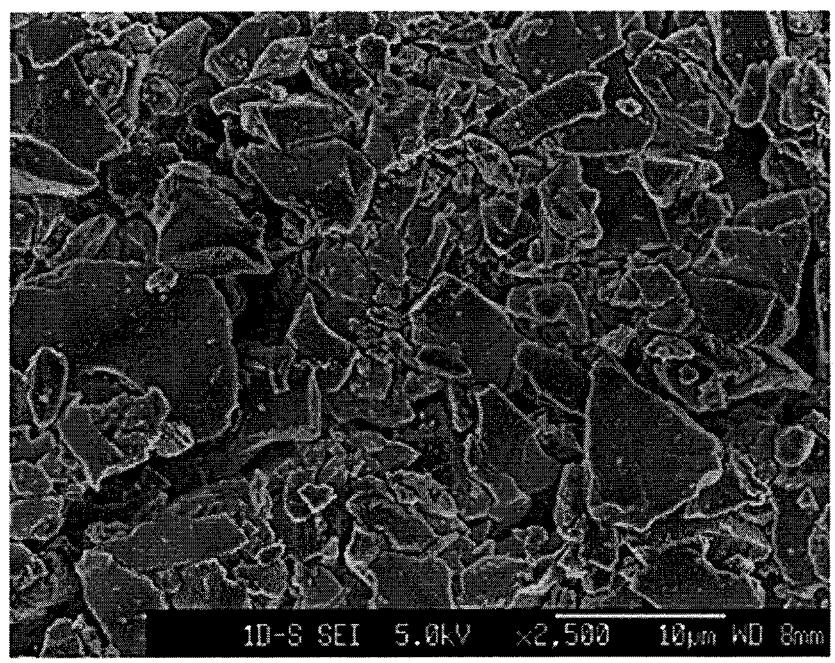
Figure 7A:
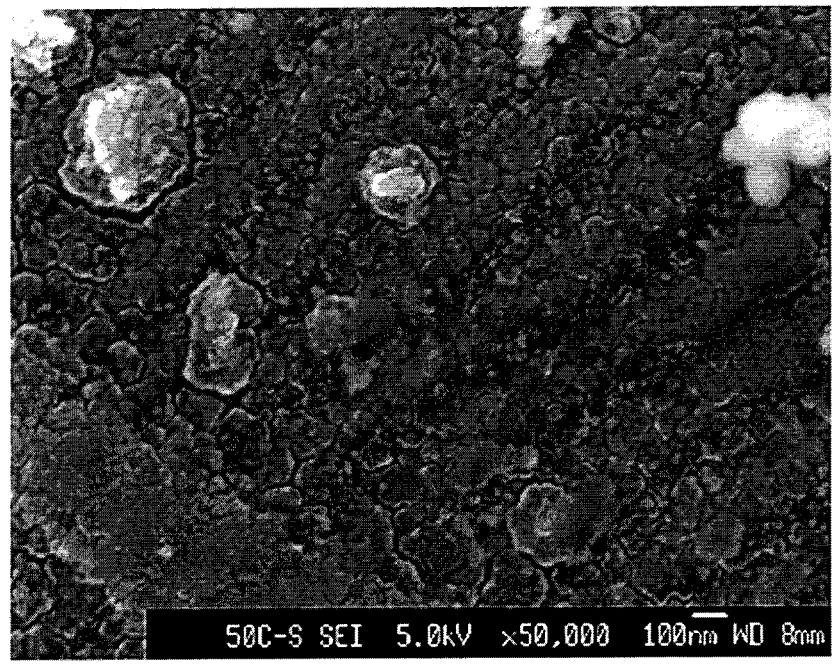
FIGS. 7A and 7B are SEM photographs taken of the surface of the SEI layer in the battery cell prepared according to Example 1 after 50 charge and discharge cycles.
Figure 7B:
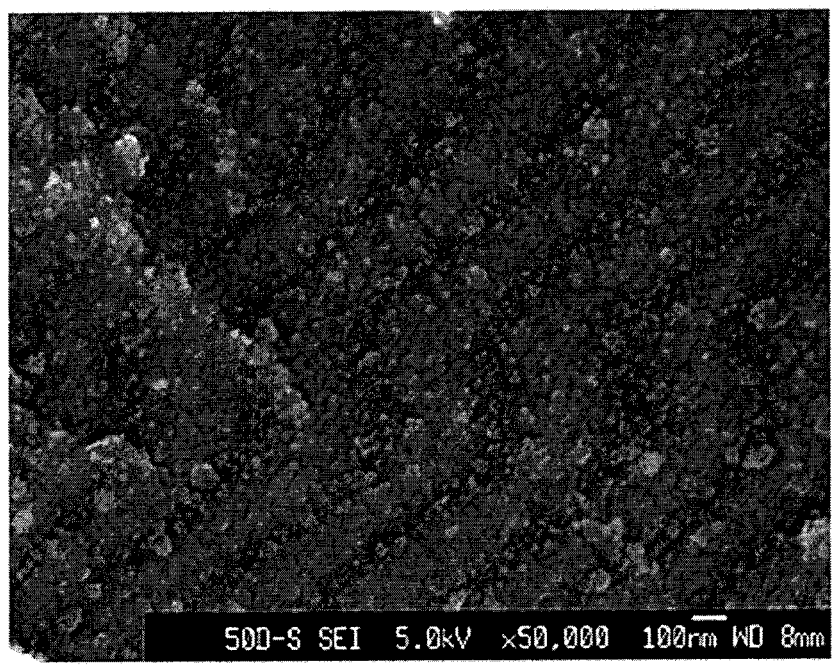

FIGS. 6A and 6B are scanning electron microscope (SEM) photographs taken of the surface of the SEI layer in the battery cell according to Example 1 after formation charge and one charge and discharge cycle. FIGS. 7A and 7B are SEM photographs taken of the surface of the SEI layer in the battery cell according to Example 1 after 50 charge and discharge cycles.

Figure 8A:
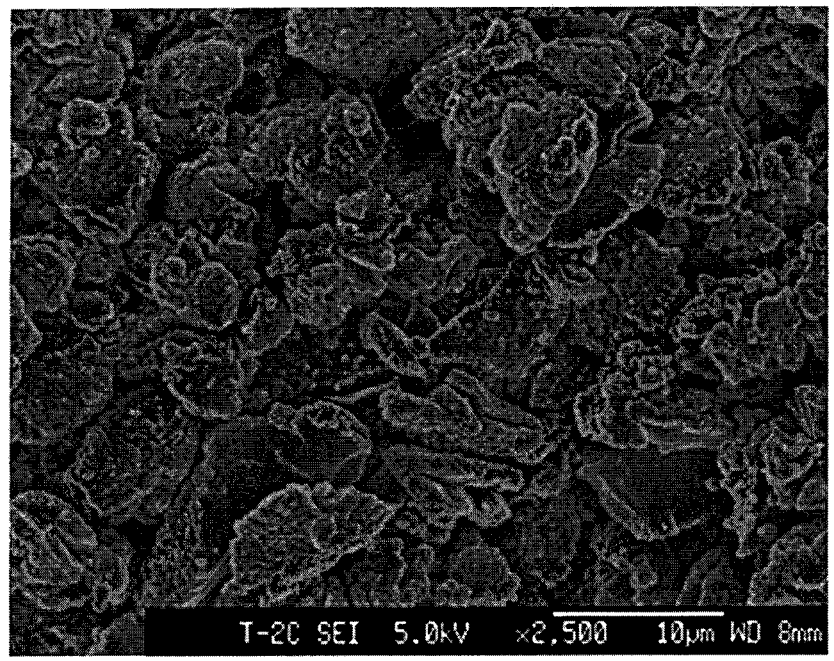
FIGS. 8A and 8B are SEM photographs taken of the surface of the SEI layer in the battery cell prepared according to Comparative Example 1 after one charge and discharge cycle.
Figure 8B:
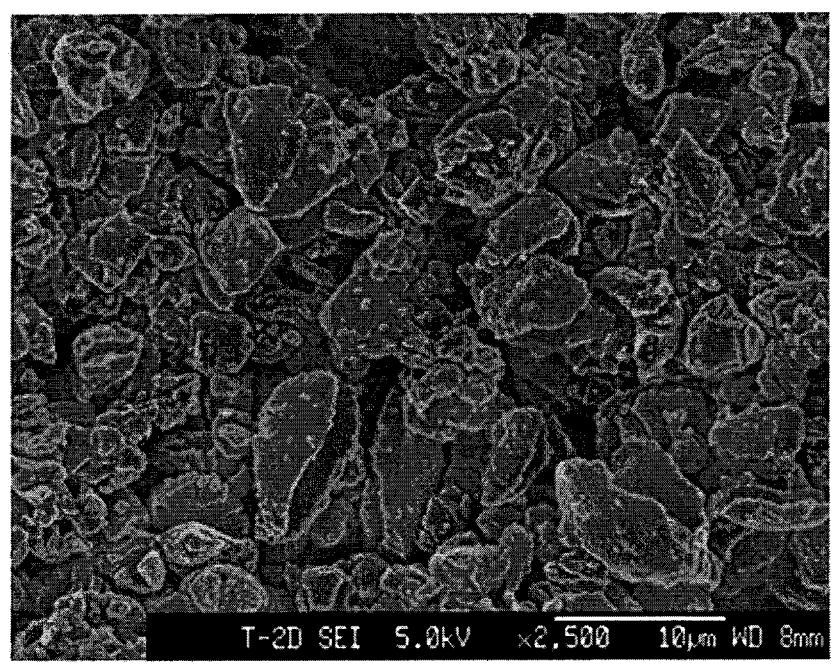
Figure 9A:
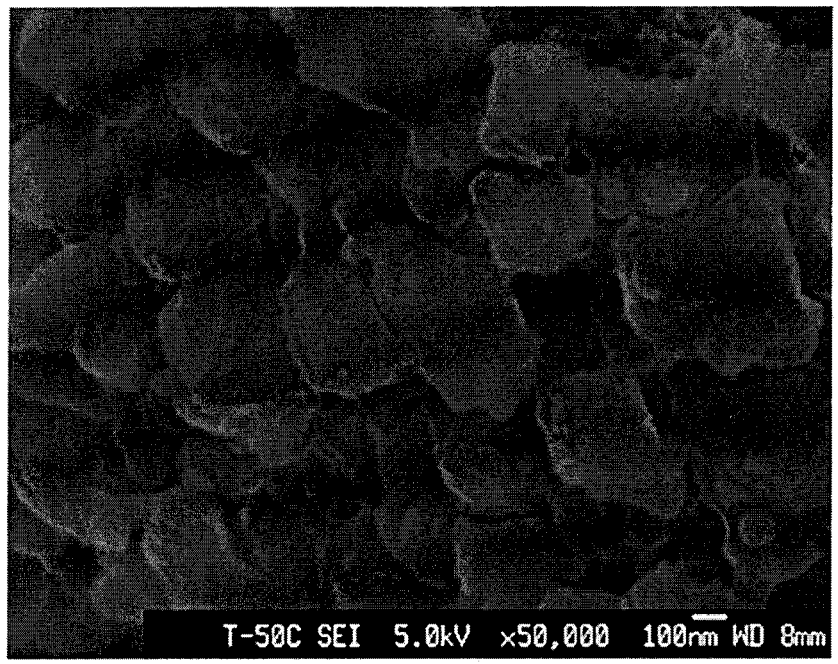
FIGS. 9A and 9B are SEM photographs taken of the surface of the SEI layer in the battery cell prepared according to Comparative Example 1 after 50 charge and discharge cycles.
Figure 9B:
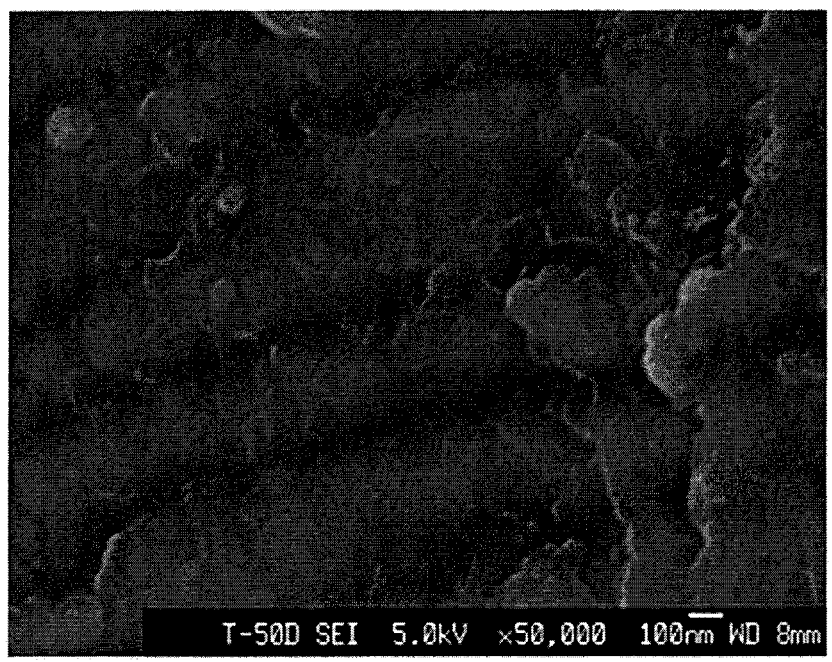

FIGS. 8A and 8B are SEM photographs taken of the surface of the SEI layer in the battery cell according to Comparative Example 1 after formation charge and one charge and discharge cycle. FIGS. 9A and 9B are SEM photographs taken of the surface of the SEI layer in the battery cell according to Comparative Example 1 after 50 charge and discharge cycles.

Referring to FIGS. 6A to 9B, the SEI layer in the battery cell according to Example 1 had a uniform and smooth surface with no cracks after initial charge as well as after 50 charge and discharge cycles. In contrast, the SEI layer in the battery cell according to Comparative Example 1 had lots of cracks and rough protrusions on the surface after charge.

Evaluation—4

The battery cells according to Examples 1 through 4 and Comparative Examples 1 and 2 were charged and discharged once and examined to evaluate how many cracks occurred on the surfaces of the SEI layers.

The battery cells were charged and discharged under the above conditions.

The crack occurrence ratio of each SEI layer was calculated as the ratio of the number of cracked particles relative to the total number of particles on the surface of the negative electrode, and was evaluated at a magnification of 2500 using a scanning electron microscope (SEM). The results are provided in Table 2 below.

TABLE 2

|  | Crack occurrence ratio (%) |
|---|---|
| Example 1 | 3 |
| Example 2 | 6 |
| Example 3 | 2 |
| Example 4 | 9 |
| Comparative Example 1 | 37 |
| Comparative Example 2 | 42 |

Referring to Table 2, the battery cells according to Examples 1 through 4 had relatively low crack occurrence ratios of about 20% or less (for example 10% or less) on the surface of the SEI layer after charge and discharge. In contrast, the battery cells according to Comparative Examples 1 and 2 had much higher crack occurrence ratios.

Evaluation—5

Figure 10:
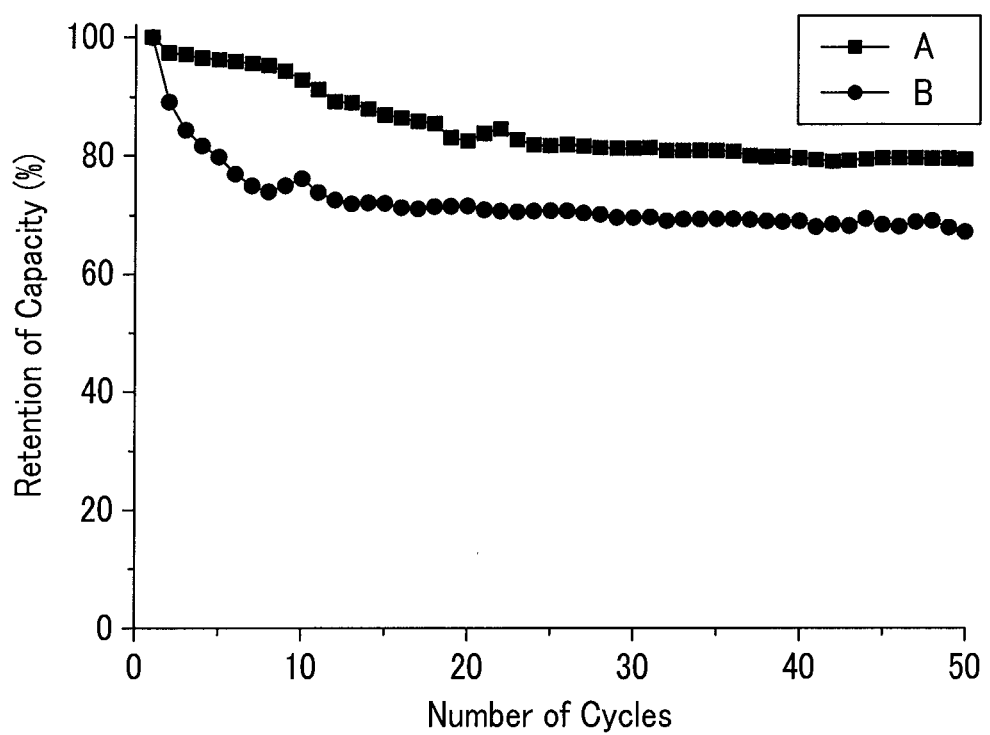
FIG. 10 is a graph comparing the capacity retention vs. number of cycles of the battery cells according to Example 1 and Comparative Example 1.

The battery cells according to Examples 1 through 4 and Comparative Examples 1 and 2 were evaluated to determine capacity retention characteristics. The evaluation results are illustrated in FIG. 10, and Table 3 below. The conditions for the charge and discharge for 50 times are as described above.

TABLE 3

|  | Capacity retention after 50 cycles (%) |
|---|---|
| Example 1 | 79.3 |
| Example 2 | 77.8 |
| Example 3 | 79.1 |
| Example 4 | 76.5 |
| Comparative Example 1 | 67.1 |
| Comparative Example 2 | 66.3 |

Referring to Table 3, the battery cells according to Examples 1 through 4 had much higher capacity retention after 50 cycles than the battery cells according to Comparative Examples 1 and 2.

FIG. 10 is a graph showing the change in capacity depending on cycle of the battery cells according to Example 1 and Comparative Example 1. Referring to FIG. 10, the battery cell (A) according to Example 1 had higher capacity per cycle (i.e., higher capacity retention) than the battery cell (B) according to Comparative Example 1. In particular, the battery cell (B) according to Comparative Example 1 had a sharp capacity drop from the initial cycle, unlike the battery cell (A) according to Example 1.

Therefore, the battery cells according to Examples 1 through 4 had higher capacity retention characteristics than the battery cells according to Comparative Examples 1 and 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lithium secondary battery comprising:
a positive electrode,
a negative electrode comprising:
   a current collector,
   an active material layer on the current collector, the active material layer comprising an amorphous silicon oxide represented by $SiO_x$ wherein $0.95<x<1.7$ and a carbon layer coated on at least a portion of the amorphous silicon oxide, wherein the carbon layer has a graphitization degree defined by a G peak with a full width at half maximum of about 50 cm$^{-1}$ to about 110 cm$^{-1}$ and a D peak with a full width at half maximum of about 70 cm$^{-1}$ to about 220 cm$^{-1}$ as evaluated using Raman spectroscopy in which the G peak is defined to have a central value of about 1580±50 cm$^{-1}$ and the D peak is defined to have a central value of about 1350±50 cm$^{-1}$, and
a solid electrolyte interface (SEI) layer on the active material layer and comprising a plurality of particles, wherein during charging of the lithium secondary battery, a surface of the SEI layer has about 70 area % or more of protrusion parts having a size ranging from about 5 nm to about 300 nm, and
an electrolyte.

2. The lithium secondary battery of claim 1, wherein the carbon layer has a thickness ranging from about 1 nm to about 100 nm.

3. The lithium secondary battery of claim 2, wherein the carbon layer has a thickness ranging from about 10 nm to about 50 nm.

4. The lithium secondary battery of claim 1, wherein the carbon layer is present in an amount of about 0.5 wt % to about 20 wt % based on a total weight of the active material layer.

5. The lithium secondary battery of claim 1, wherein during charging of the lithium secondary battery, the SEI layer includes about 70 area % to about 99.9 area % of the protrusion parts having a size ranging from about 5 nm to about 300 nm.

6. The lithium secondary battery of claim 5, wherein during charging of the lithium secondary battery, the SEI layer includes about 80 area % to about 90 area % of the protrusion parts having a size ranging from about 5 nm to about 300 nm.

7. The lithium secondary battery of claim 1, wherein the active material layer has substantially no crystalline Si particles.

8. The lithium secondary battery of claim 1, wherein the SEI layer comprises $Li_2CO_3$, a Si—F bonding structure, or a combination thereof.

9. The lithium secondary battery of claim 1, wherein the electrolyte comprises at least one solvent selected from the group consisting of ethylene carbonate (EC), fluorinated ethylene carbonate (FEC), ethylmethyl carbonate (EMC), and diethylcarbonate (DEC).

10. The lithium secondary battery of claim 1, wherein the electrolyte comprises a solvent comprising fluorinated ethylene carbonate (FEC) at 10 volume % or more based on the total volume of the solvent.

11. The lithium secondary battery of claim 1, wherein the SEI layer is soluble in the electrolyte.

12. The lithium secondary battery of claim 1, wherein the active material layer has a crack occurrence ratio of about 20% or less.

13. The lithium secondary battery of claim 1, wherein $1<x<1.25$.

* * * * *